US008931150B2

(12) United States Patent
Luangphon

(10) Patent No.: US 8,931,150 B2
(45) Date of Patent: Jan. 13, 2015

(54) SPRING ATTACHMENT TOOL FOR AIR BRAKE SHOES

(76) Inventor: Ole Luangphon, Goodyear, AZ (US)

( * ) Notice: Subject to any disclaimer, the term of this patent is extended or adjusted under 35 U.S.C. 154(b) by 540 days.

(21) Appl. No.: 13/369,544

(22) Filed: Feb. 9, 2012

(65) Prior Publication Data

US 2012/0204392 A1 Aug. 16, 2012

Related U.S. Application Data

(60) Provisional application No. 61/463,211, filed on Feb. 14, 2011.

(51) Int. Cl.
*B23P 19/04* (2006.01)
*B25B 27/30* (2006.01)

(52) U.S. Cl.
CPC .................................... *B25B 27/306* (2013.01)
USPC ............................................... 29/225; 29/278

(58) Field of Classification Search
USPC ............... 29/255, 278, 270, 244; 269/3, 6, 95
See application file for complete search history.

(56) References Cited

U.S. PATENT DOCUMENTS

| | | | | |
|---|---|---|---|---|
| 4,108,026 | A * | 8/1978 | Anderson et al. | 81/488 |
| 5,237,729 | A * | 8/1993 | Martin | 29/227 |
| 5,909,910 | A * | 6/1999 | Shaffer | 29/243.56 |
| 6,085,616 | A * | 7/2000 | Habermehl | 81/55 |
| 7,600,305 | B2 * | 10/2009 | Ploeger et al. | 29/235 |
| 7,690,239 | B2 * | 4/2010 | Griffis | 72/458 |
| 8,726,767 | B2 * | 5/2014 | Flamion | 81/99 |
| 2008/0035900 | A1 * | 2/2008 | Flores | 254/21 |
| 2010/0212463 | A1 * | 8/2010 | Kellum, III | 81/177.1 |
| 2012/0204392 | A1 * | 8/2012 | Luangphon | 29/225 |

* cited by examiner

*Primary Examiner* — Lee D Wilson
(74) *Attorney, Agent, or Firm* — Hartman Titus PLC; Joseph W Mott

(57) ABSTRACT

A tool for attaching and disengaging a return spring in a truck brake assembly comprises a handle, a shaft, and an arm with a hook and a smaller reverse hook. The hook provides leverage around the spring retainer and the reverse hook engages the spring end to move it into place.

9 Claims, 7 Drawing Sheets

SPRING ATTACHMENT TOOL FOR AIR BRAKE SHOES

CROSS REFERENCE TO RELATED APPLICATIONS

This application claims the benefit of U.S. Provisional Patent Application 61/463211, filed Feb. 11, 2011.

BACKGROUND OF THE INVENTION

The present invention relates to servicing of the brakes on large trucks, primarily tractor-trailer configurations. It provides a convenient tool for the disassembly and reassembly of the wheel-mounted portion of the brake mechanism when the unit must be serviced A typical configuration for truck/trailer air brakes is a pair of approximately semi-circular components called "shoes," each contacting half of a circular brake drum surrounding the axle of the vehicle. Brake pads, which may be metal or ceramic composites designed to withstand the heat and pressure of substantial friction, are attached to the outer surface of the shoes. When a brake pedal is depressed, a compressed air delivery network causes a cam to turn, which pushes the brake shoes outward, causing the pad to frictionally engage the surrounding drum as it rotates, slowing its motion to a stop.

The brake shoes are attached to a spider, a round plate on the end of the axle, by anchor pins or other components. The brake shoes are movably secured to each other by springs, so that after the brake pedal is released, the shoes and pads withdraw from contact with the drums. Most brake assemblies have one or two retainer springs on one side of the axle and a return spring on the side of the axle adjacent the cam. The return spring must quickly pull the shoe away from the drum when the brake is released, and such springs are very strong, often 100 lb tension or more. When truck brakes are serviced, the shoes must be removed to replace the pads, and this entails stretching the retainer and return springs to remove them from their anchor positions. These springs are usually replaced as part of the service. The return spring, in particular, is difficult to stretch, and service personnel must find a way to carefully apply leverage to accomplish this. When standard tools, such as screwdrivers, pry bars or pliers are used, frustration and injuries can result as the spring slips from the tool.

BRIEF SUMMARY OF THE INVENTION

The present invention provides a tool for removing and for reattaching the return spring on the most common air brake configuration in the industry, the Q and Q Plus brake systems made by the Arvin Meritor Corporation. It may also be useful in handling the return spring in other systems. The tool incorporates a handle, a shaft, and a double curved hook that enables a mechanic to engage and release the return spring with a twist of the device.

DETAILED DESCRIPTION

Figure 1:
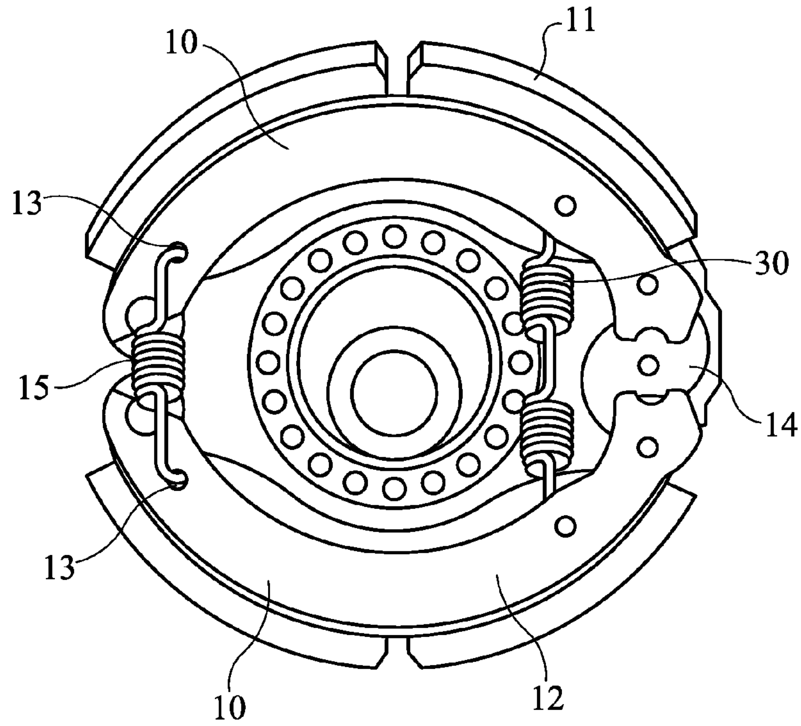
FIG. 1 is a depiction of a truck air brake assembly.

The configuration of the Q and Q Plus brake assemblies is shown in FIG. 1. Brake shoes 10 with attached pads 11 are on top and bottom halves of a circular configuration. Cam 14, when rotated by the air pressure system activated by the driver's brake pedal, forces the shoes outward so the pads contact the surrounding drum (not shown) and slow the rotation of the wheel. A pair of retaining springs 15, hooked through apertures 13 in the web 12 of the shoe 10 on the opposite side from the cam 14, and a return spring 30 hooked over upper and lower return spring retainers 35, 36 hold the shoes together.

Figure 2:
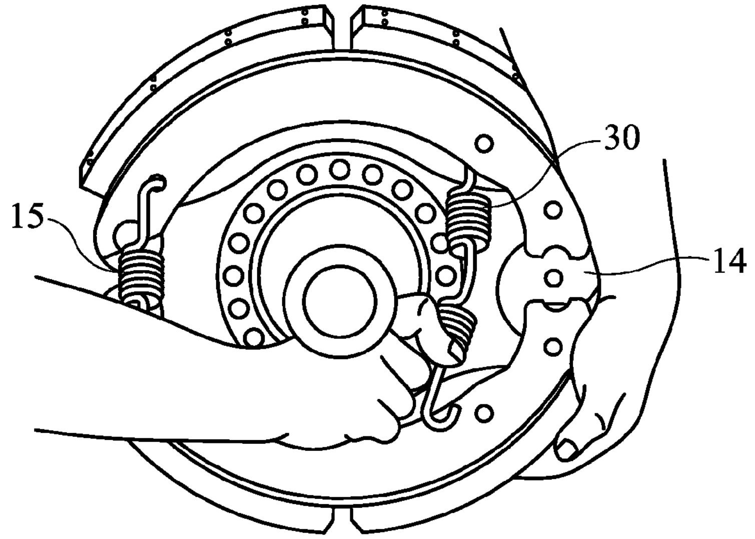
FIG. 2 is a diagram showing a step in removal of a brake assembly.
Figure 3:
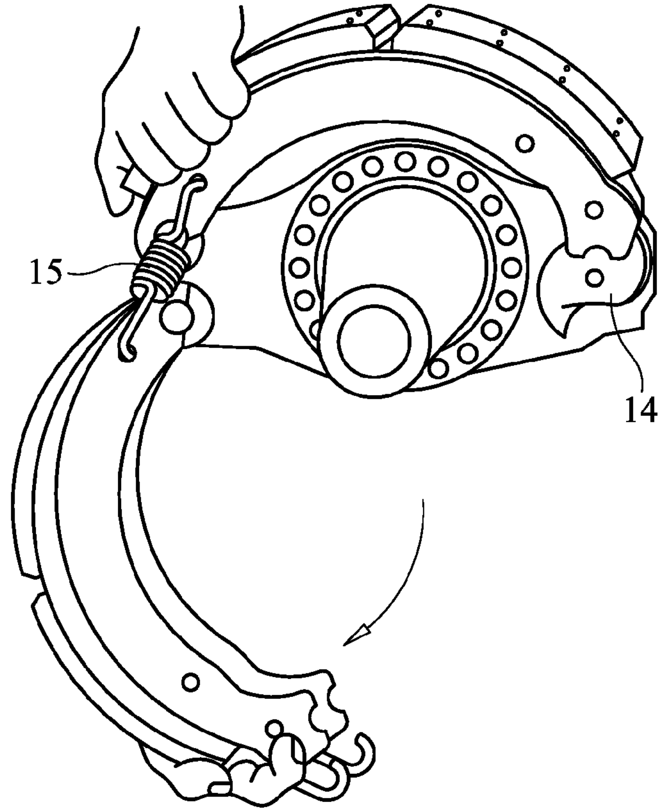
FIG. 3 is a diagram showing a second step in removal of a brake assembly.
Figure 4:
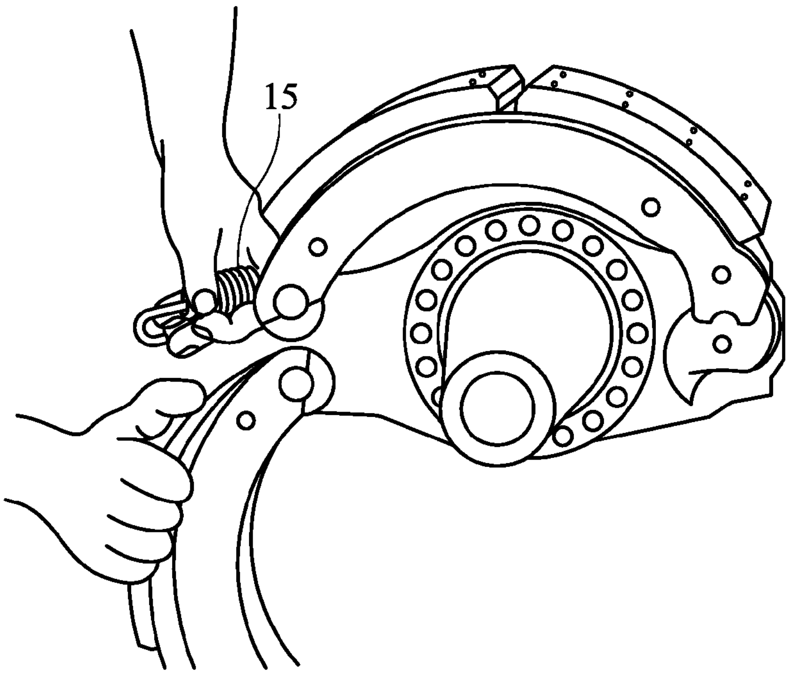
FIG. 4 is a diagram showing the first step of installing a brake assembly.
Figure 5:
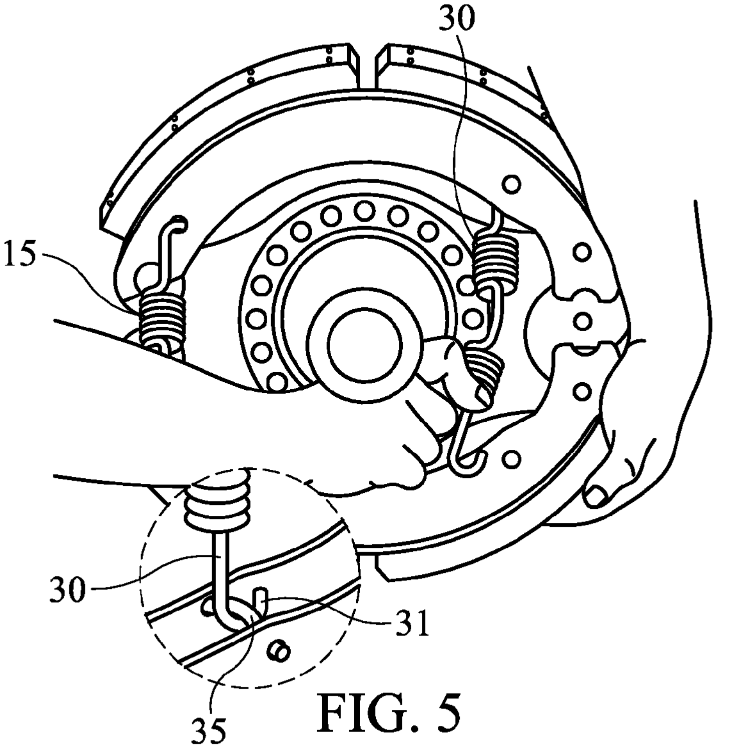
FIG. 5 is a diagram showing the second step of installing a brake assembly.

The recommended method for disassembly of the brake involves releasing the return spring 30 first, then the retaining springs 15. See FIGS. 2 & 3. Similarly, on assembly the retaining springs 15 are set, the return spring retainers 35, 36 are inserted, and the return spring 30 is attached. See FIGS. 4 & 5. Because of the strength of the return spring, particularly when a heavy duty spring is used, a tool is needed to stretch the spring over the retainer. Mechanics may use a long screwdriver, a pry bar or long-handled pliers to pull the spring end over the retainer. These tools sometimes slip, resulting in frustration and occasional hand injuries.

Figure 6:
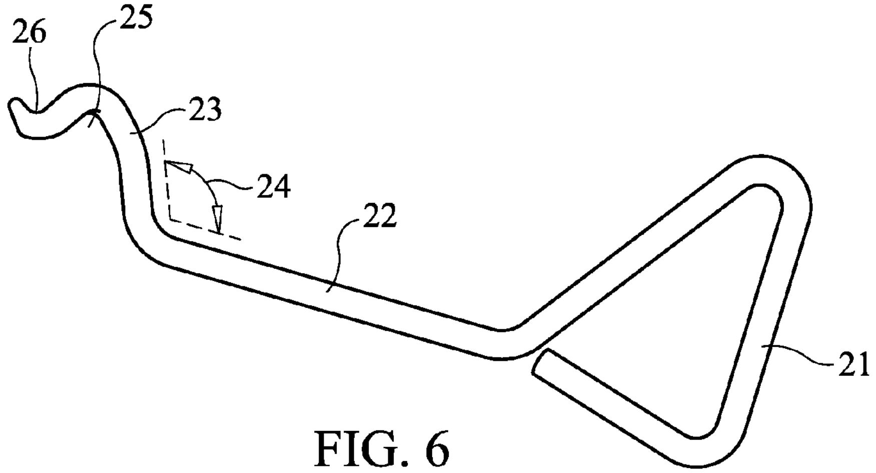
FIG. 6 is a view of an embodiment of the invention.
Figure 7:
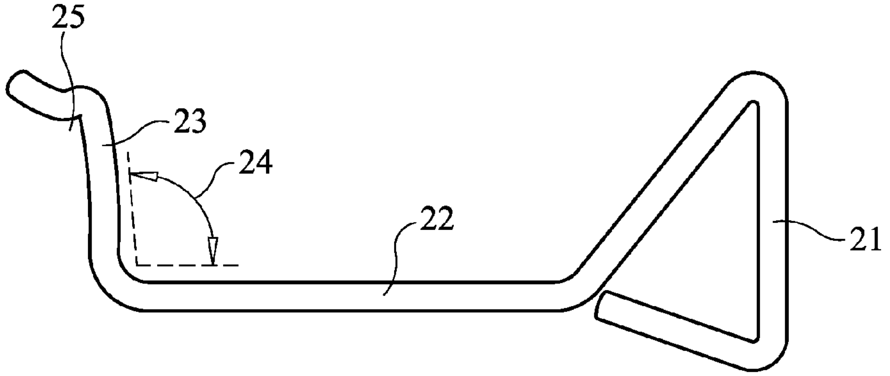
FIG. 7 is another view of the embodiment of FIG. 6.
Figure 8:
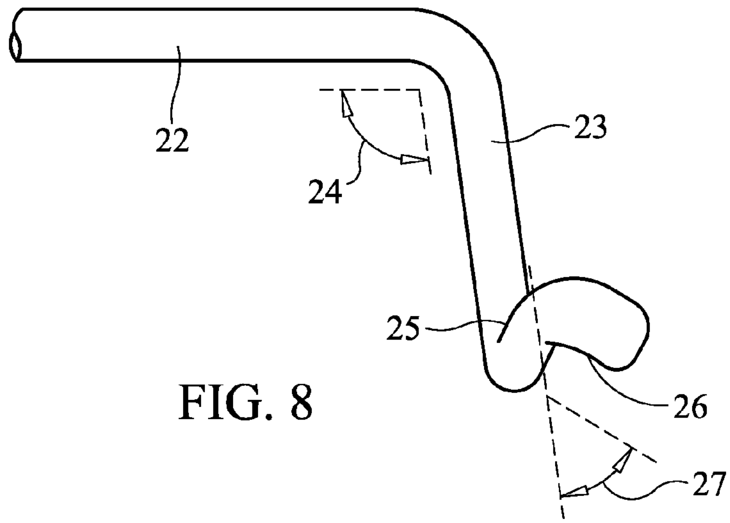
FIG. 8 is a view of the distal end of an embodiment of the invention.
Figure 9:
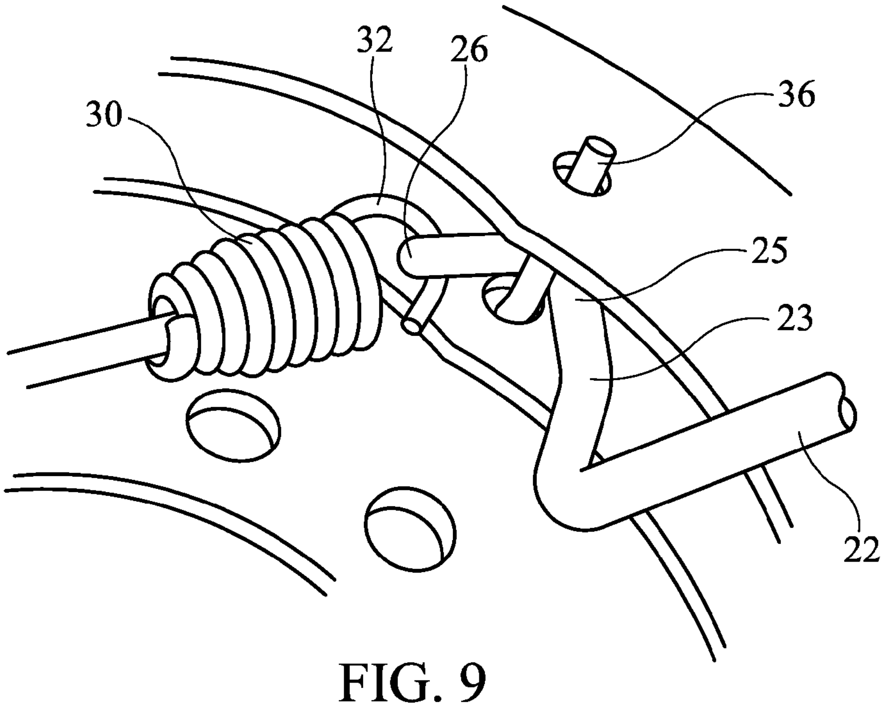
FIG. 9 shows a step in attaching a return spring.
Figure 10:
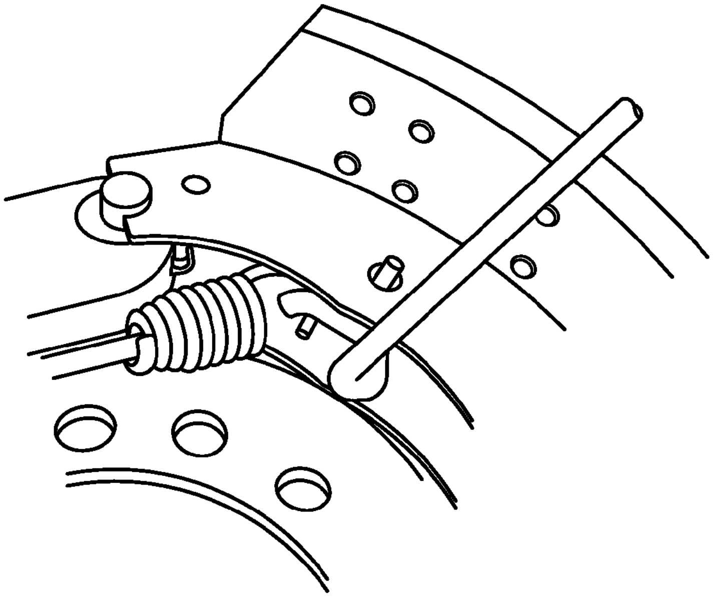
FIG. 10 shows a step in attaching a return spring.
Figure 11:
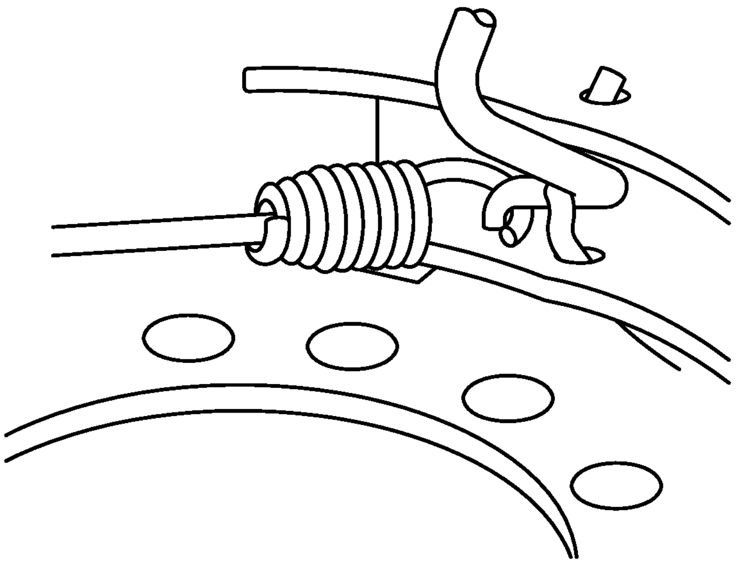
FIG. 11 shows a step in attaching a return spring.
Figure 12:
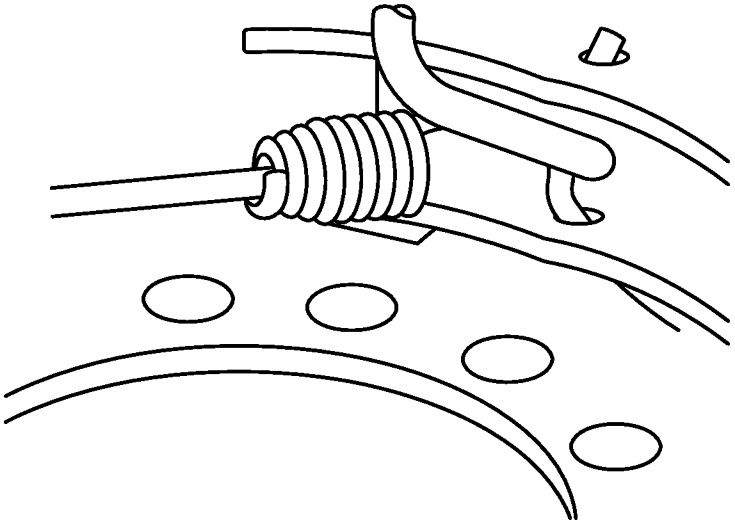
FIG. 12 shows a step in attaching a return spring.
Figure 13:
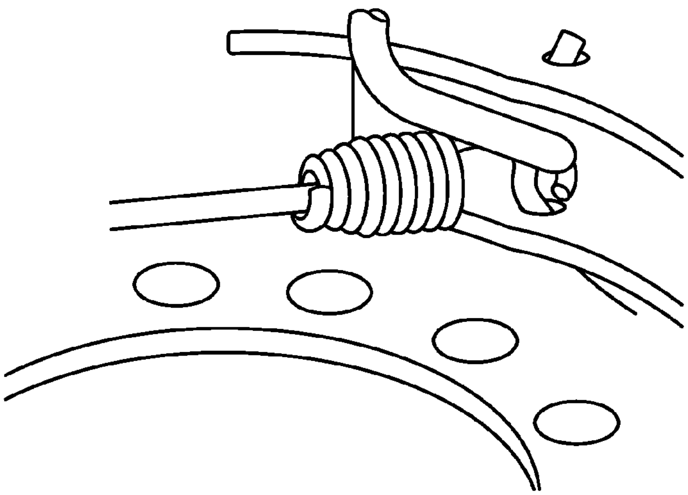
FIG. 13 shows a step in attaching a return spring
Figure 14:
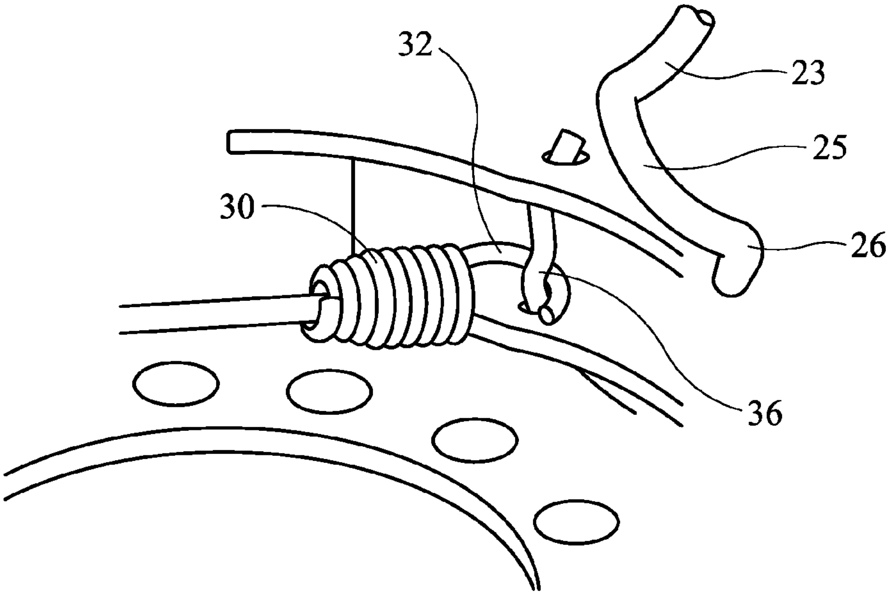
FIG. 14 shows a step in attaching a return spring.

The present invention is a tool configured to stretch a return spring onto or off of the retainer bar. One embodiment of the tool is shown in FIGS. 6-8. It comprises a handle 21, an extended shaft 22, a short arm 23 at approximately a right angle 24 from the shaft 22, a first hook 25 in a plane approximately perpendicular to the plane of the shaft 22 and a short reverse hook 26. An embodiment of this type may be fabricated by bending a single ⅜ inch steel rod into the appropriate shape. In one embodiment, the extended shaft is about 6 inches long, the arm of the first hook is about 2 ½ inches with a ½ inch curvature radius at its end and the short hook has a ¼ inch reverse curvature radius extending in a plane parallel to that of the shaft and rotated at an angle 27 of about 45 degrees in a direction away from the handle.

The reverse hook 26 may be in the same plane as that of first hook 25, meaning that angle 27 is zero degrees, or it may be rotated as much as about 90 degrees away from the handle 21. Preferably the rotation angle 27 is between about 5 degrees and about 65 degrees, and more preferably it is about 45 degrees. The handle 21 is for grasping and operating the tool with sufficient leverage to extend the return spring 30, and may be of any configuration, including a simple extension of the shaft 22.

Using the tool to attach the heavy duty return spring is illustrated in FIGS. 8-12. With the shoes set in place on the spider and the retaining springs in position, the lower return spring hook 31 is hooked over the lower return spring retainer 35 and the upper return spring hook 32 is placed next to the in-place upper return spring retainer 36. The first hook 25 of the tool is hooked around the retainer 36 and the short hook 26 of the tool engages the upper return spring hook 32. Rotating the tool about the retainer 36 as a fulcrum stretches the spring and pulls its hook end toward the retainer. With a twist of the tool, the spring hook is pulled over the retainer and can be released onto the retainer, completing the installation. To remove the return spring, the steps are reversed. The tool's first hook is hooked over the retainer and the short hook engages the spring hook. The retainer is used as a fulcrum to stretch the spring, and twisting the tool moves the upper hook of the spring away from the retainer, thereby releasing the spring.

The foregoing description has been presented and is intended for the purposes of illustration and description. It is not intended to be exhaustive nor limit the invention to the above teachings. The embodiments were chosen and described in order to best explain the principles of the invention and its practical application and to enable others skilled in the art to best utilize the invention in various embodiments and with various modifications as are suited to the particular use contemplated. Therefore, it is intended that the invention not be limited to the particular embodiments disclosed for carrying out the invention.

I claim:

1. A tool for attaching a return spring to a brake assembly, comprising a handle, a shaft extending from the handle, an arm extending at approximately a right angle from a distal end of the shaft, a first hook extending from the arm in a plane perpendicular to the shaft, and a short hook in a reverse direction from the first hook, wherein the orientation of the short hook is rotated between about thirty degrees and about sixty degrees in a direction away from the handle.

2. The tool of claim 1 wherein the orientation of the short hook is rotated about forty-five degrees in a direction away from the handle.

3. A tool for attaching a return spring to a brake assembly, comprising a handle, a shaft extending from the handle, an arm extending at approximately a right angle from a distal end of the shaft, a first hook extending from the arm in a plane perpendicular to the shaft, and a short hook in a reverse direction from the first hook, wherein the shaft is about 6 inches long, the first arm is about 2 ½ inches long, leading to the first hook having about a ½ inch radius of curvature, and the short hook has about a ¼ inch radius of curvature.

4. The tool of claim 3, wherein the orientation of the short hook is rotated slightly in a direction away from the handle.

5. The tool of claim 3, wherein the orientation of the short hook is rotated between about five degrees and about ninety degrees in a direction away from the handle.

6. The tool of claim 1, comprising a single ⅜ inch steel rod.

7. The tool of claim 3, comprising a single ⅜ inch steel rod.

8. The tool of claim 4, comprising a single ⅜ inch steel rod.

9. A tool for attaching a return spring to a brake assembly, comprising a ⅜ inch steel rod comprising a handle, a shaft extending about 6 inches from the handle, an arm extending about 2 ½ inches at approximately a right angle from a distal end of the shaft, a first hook having about a ½ inch radius of curvature extending from the arm in a plane perpendicular to the shaft, and a short hook in a reverse direction from the first hook, having about a ¼ inch radius of curvature and an orientation rotated about 45 degrees in a direction away from the handle.

* * * * *